Aug. 23, 1955 W. V. SCHMIDT 2,715,848
LATHE TOOL HOLDER
Filed Sept. 25, 1950 2 Sheets-Sheet 1

Walter V. Schmidt
INVENTOR.

Aug. 23, 1955 W. V. SCHMIDT 2,715,848
LATHE TOOL HOLDER
Filed Sept. 25, 1950 2 Sheets-Sheet 2
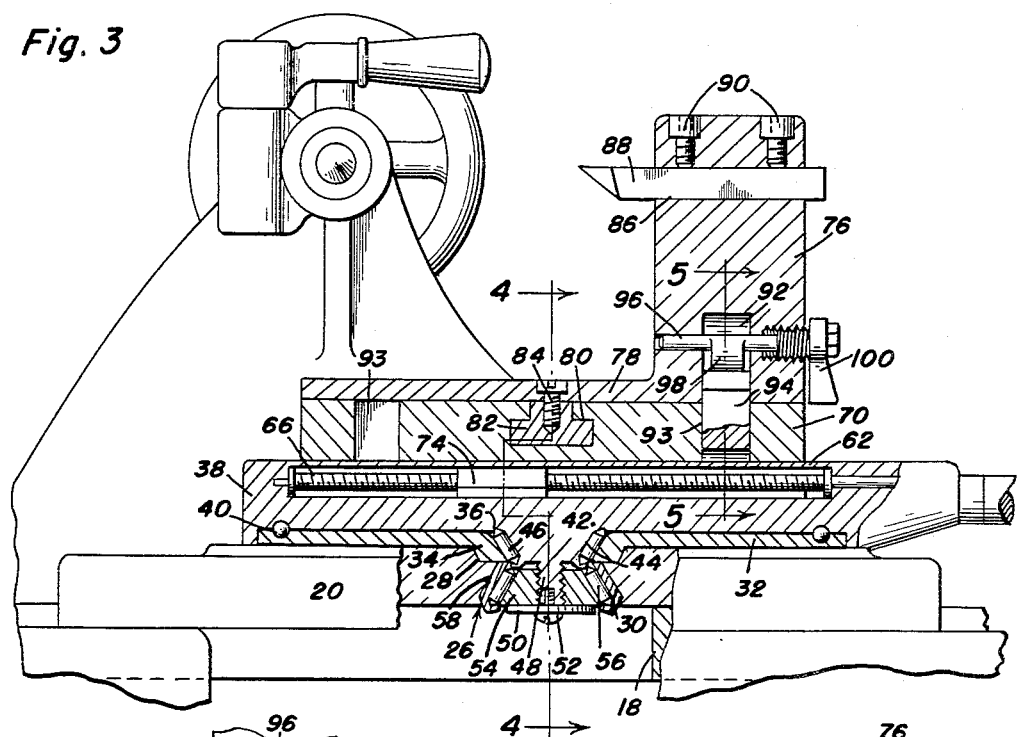
Walter V. Schmidt
INVENTOR.

United States Patent Office 2,715,848
Patented Aug. 23, 1955

2,715,848

LATHE TOOL HOLDER

Walter V. Schmidt, Highland Falls, N. Y.

Application September 25, 1950, Serial No. 186,534

4 Claims. (Cl. 82—12)

This invention comprises novel and useful improvements in a lathe tool holder, and more specifically relates to an improved construction of a lathe compound tool carriage attachment by means of which concave or convex arcs may be precisely cut or machined with a conventional compound lathe.

The primary object of this invention is to provide a compound tool carriage for cutting convex and concave arcs with a machine lathe.

A further object of the invention is to provide an improved compound tool carriage for lathes in accordance with the preceding object in which the tool is capable of receiving a full 360° of pivoting movement.

A still further object of the invention is to provide an improved tool carriage for lathes in conformity with the above objects which is capable of positively locating the tool point registry without slipping, at the lathe center height and above the same as desired, which is capable of utilizing a small pointed lathe tool for the cutting operation in machining convex and concave curves or arcs, and which shall incorporate therein the advantages of a thrust bearing and pivot assembly.

These, together with various objects and features of the invention which will later become apparent as the following description proceeds, are attained by the present invention, a preferred embodiment of which has been illustrated, by way of example only, in the accompanying drawings, wherein:

Figure 3 is a vertical transverse sectional view taken substantially upon the plane indicated by the section line 3—3 of Figure 1;

Figure 4 is a vertical longitudinal sectional view taken substantially upon the plane by the section line 4—4 of Figure 3;

Figure 5 is a vertical longitudinal sectional detail view taken substantially on the plane indicated by the section line 5—5 of Figure 3; and Figure 6 is a perspective assembly view showing certain elements in accordance with this invention.

Figure 1:
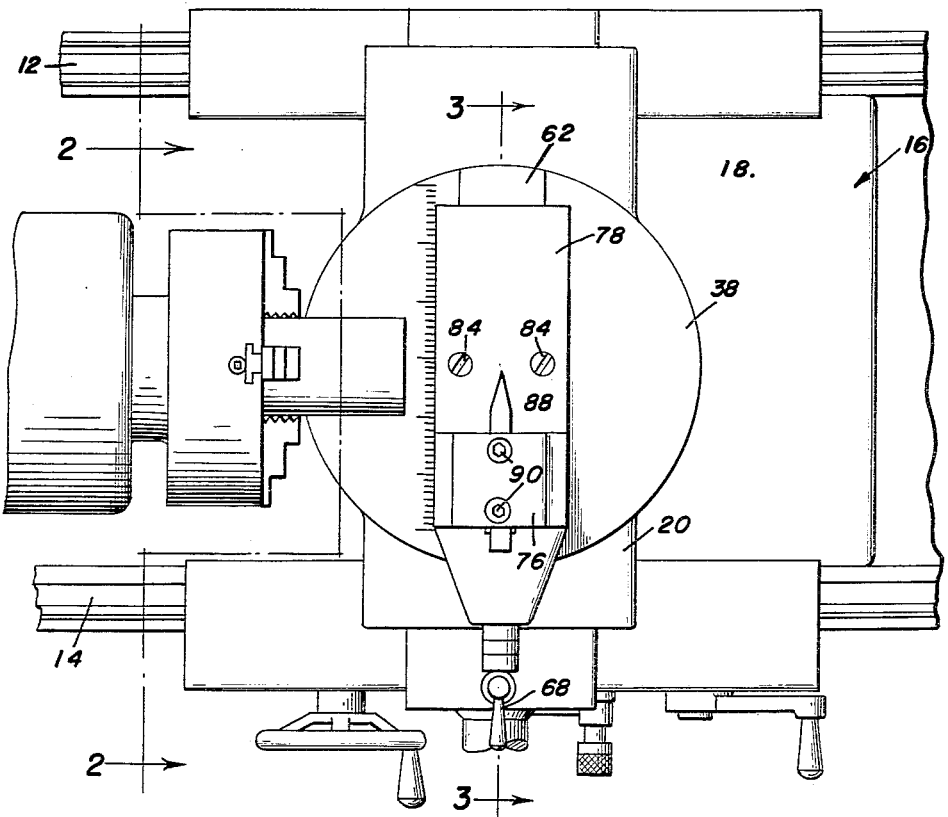
Figure 1 is a top plan view showing a compound tool carriage for lathes in which have been incorporated the principles of this invention.

Referring now more specifically to the accompanying drawings, wherein like numerals designate similar parts throughout the various views, there is shown a portion of the bed of the lathe, of any conventional type, which is indicated generally by the numeral 10 and which includes the usual guideways 12 and 14 upon which is slidably mounted for movement longitudinally of the lathe a compound tool carriage indicated generally by the numeral 16.

This tool carriage is provided with the customary feed screw by means of which the carriage may be manually or automatically moved longitudinally of the lathe bed and guideways to perform various operations with the tool in accordance with conventional practice.

The compound carriage includes the stationary member 18 which is movable longitudinally upon the ways 12 and 14, and an upper transverse feed member 20 which is mounted upon the stationary member 18 for movement transversely thereof for adjusting the carriage toward and from the line of centers of the lathe.

Figure 2:
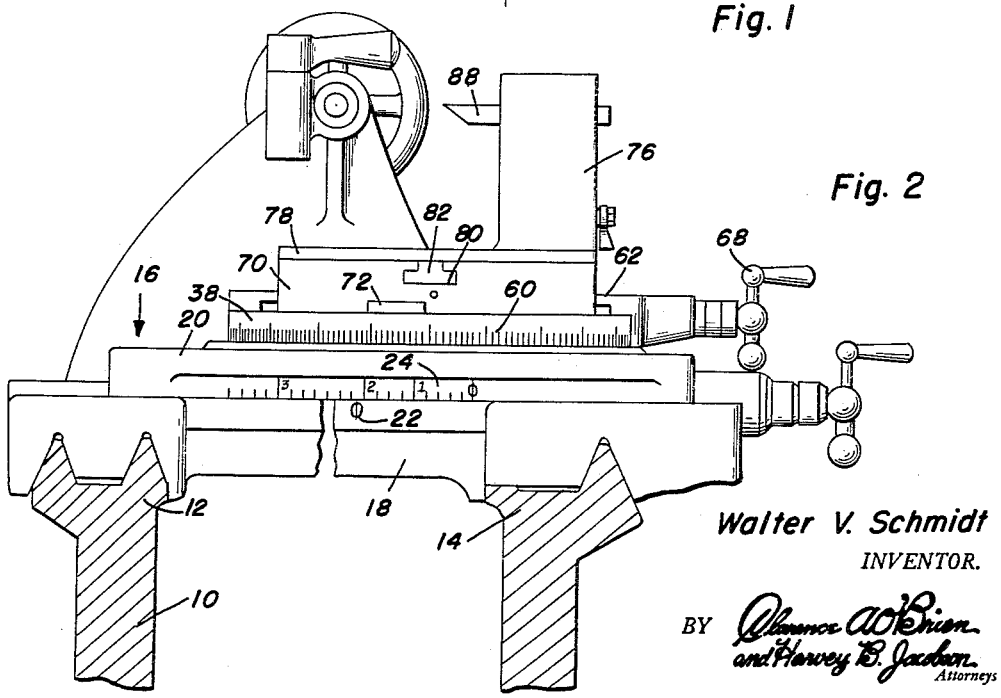
Figure 2 is a vertical transverse sectional view taken substantially upon the plane indicated by the section line 2—2 of Figure 1.

Conveniently, as shown in Figure 2, the stationary member is provided with a reference indicia indicated at 22, while complementary indicia 24 carried by the transverse feed member 20 are adapted to selectively register with the indicia 22 for indicating the distance of the tool carried by the carriage from the line of centers of the lathe.

The transverse feed member 20 is provided with an aperture 26 whose upper and lower portions are reversely conically tapered, as at 28 and 30.

An insert plate 32 forming a bearing plate is secured to the upper surface of the transverse feed member 20, this insert plate having a downwardly flared axial bushing 34 which is adapted to be snugly received in the conical portion 28, the interior of this bushing having a conical bearing surface 36.

A circular plate 38 comprising a swivelling member is rotatably journaled upon the insert plate 32, as by a circular series of anti-friction bearings 40, see Figure 3, complementary bearing raceways being provided, this swivelling member having a depending axial projection 42 having a conical bearing surface 44 which constitutes the inner bearing race in conjunction with the previously described outer bearing race 36, whereby anti-friction thrust bearings 46 are retained between the bushing 34 and the projection 42. The lower part of the projection 42 is provided with an axial depending extension 48 which is externally threaded, and upon which is secured, as by a washer 50 and screw 52, a bearing member 54 having a conical surface forming an inner bearing race which, by means of a plurality of roller bearings 56, is carried by a conical outer bearing race in the form of a ring 58 received in the bevelled bore 26.

By virtue of the oppositely bevelled bearings, it will be seen that the swivelling member 38 is rotatably mounted upon the carriage transverse feed member 20 and that provision is made for circular movement throughout 360° in a horizontal plane and for adjusting the pivot bearing to compensate for thrust or wear upon the same.

As shown in Figures 2 and 6, the peripheral surface of the swivelling member 38 may be provided with suitable indicia 60, appropriately calibrated in degrees, whereby the rotational angular position of the swivelling member with respect to the line of centers of the lathe may be readily determined and adjusted.

The member 38 has mounted thereon a bridge disposed diametrically of and overlying the same as indicated at 62, this bridge having tapering sides as at 64 and constituting a slide retainer or guide for a purpose which will be later apparent. An adjusting screw 66 is rotatably supported on the swivelling member 38 and extends below the bridge 62, this adjusting screw being provided with an operating handle 68. A support plate or slide 70 is provided having a channel having bevelled side walls for slidingly engaging the bevelled sides 64 of the bridge 62, and has fixedly secured thereto a cross-bar 72 which extends transversely and slidably between the bridge 62 and the member 38 and is provided with an internally threaded bushing or nut 74 which screw-threadedly engages the screw 66.

It will now be apparent that by rotating the screw 66, the slide 70 will be moved diametrically of the swivelling member 38 and thus adjusted transversely with respect to the line of centers of the lathe.

A tool holder 76 having a supporting base 78 is adjustably secured to the member 70. For this purpose, as shown in Figures 2 and 3, the member 70 is provided with a T-shaped slot 80 which extends across its upper surface, and a T-shaped key 82 is slidably received in this slot, the base 78 being secured to this key as by a screw 84. It will now be apparent that by loosening the screw, the base 78 with the tool holder 76 may be adjusted transversely with respect to the member 70 and may be locked in any adjusted position by tightening the screw 84.

It should be understood that only a very small transverse adjustment of the base 78 is needed, the adjustment being useful in positioning the point of the tool in the tool post 76 in engagement with the work upon the line perpendicular to the work and which passes through the axis of rotation of the member 38, this small adjustment being useful when the member 38 is rotated slightly from the position shown in Figure 1.

The primary utility of the T-slot 80 and key 82 is to permit the tool post and its base 78 to be reversed upon the plate 70, whereby the tool post and the tool will be disposed between the vertical axis of rotation and the work to cut concave arcs.

In some instances, the members 70 and 78 could be integral or rigidly secured together, omitting the above function.

Obviously, any suitable means can be provided for locking the members 38 and 20 together in rotationally adjusted relation, and in automatically driving in synchronized relation both the transverse feed of the screw 66 and the rotation of 38 about its vertical axis.

At its upper portion, the tool post 76 is provided with the customary tool receiving bore 86 in which is retained a cutting tool 88 of any conventional design as by Allen screws or the like 90.

It will be apparent from Figures 2 and 3 that the cutting tools 88 are disposed in the same horizontal plane passing through the line of centers of the lathe, and that by the foregoing and hereinbefore described constructions the tool may be positioned at any desired angular inclination, in a horizontal plane, with respect to the line of centers.

A novel clamping means is provided in order to securely lock the slide 70 to the swivelling member 38. For this purpose, there are provided registering bores 92 and 93 disposed in the members 76 and 70 for the reception of a plunger 94 which is slidable therein, this plunger having a cylindrical or arcuate recess 94 in its lower end, this recess straddling the relatively thin and weak portion of the slide member 62 above the feed screw 66, as shown in Figure 5.

As seen in Figure 3, the pair of the bores 93 are so positioned that the bore 92 may register with one when the bore 76 is reversed on the plate 70. The member 94 will have a loose or sloppy fit in bore 93 to permit the above-mentioned limited transverse movement of 78 upon 70.

As shown best in Figures 3 and 5, a locking pin 96 is journaled in the tool holder 76 and intersects the bore 92, this locking pin having an eccentric or cam member 98 disposed in the bore 92 and contacting the upper end of the plunger 94. The locking pin 96 is provided with a handle 100 whereby the same may be rotated to selectively press the plunger 94 downwardly against the bridge 62 for thereby positively locking the slide 70 with the tool holder carried thereby to the swivelling member 38.

The operation of the invention is as follows: At all times, the tool 88 will be positioned in the horizontal plane extending through the lathe line of centers. When it is desired to cut a concave arc on a work piece mounted in the lathe centers, the transverse feed member 20 is adjusted transversely of the line of centers to position the vertical axis through the axial projection 42 of the swivelling member 38 between the line surface of the work piece and the tool. Swivelling movement of the member 38 will thus move the tool point in a concave arc or path of travel relative to the work piece.

When a convex arc is to be cut, the device is so adjusted as to position the cutter point between the vertical axis and the surface of the work piece.

The adjustability of the device is enhanced by the 360° of rotation possible for the swivelling member and by the lateral adjustment of the tool holder upon the swivelling member.

From the foregoing, it will be apparent that there has been provided a device which is capable of obtaining the object set forth hereinbefore and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. A lathe tool including a compound tool carriage having an upper member, a swivelling member mounted upon said upper member for horizontal pivoting movement about a vertical axis, a guide member fixedly secured above and diametrically of said swivelling member, a slide mounted on said guide member, a tool post mounted on said slide, said slide having a transverse bar extending between said guide and swivelling members, said bar having a threaded bore, an adjusting screw journaled in said swivelling member and engaging said threaded bore, means for locking said slide to said swivelling member, said last means including a bore in said slide, a plunger slidable in said bore, an actuator for pressing said plunger against said swivelling member.

2. The combination of claim 1 wherein said tool post has an opening in communication with said bore in said slide, said plunger having a portion slidably extending into said opening.

3. The combination of claim 1 wherein said tool post has an opening in communication with said bore in said slide, said plunger having a portion slidably extending into said opening, said actuator being mounted upon said tool post and having an operative engagement with said plunger.

4. The combination of claim 1 wherein said tool post has an opening in communication with said bore in said slide, said plunger having a portion slidably extending into said opening, said actuator being mounted upon said tool post and having an operative engagement with said plunger, said actuator including a shaft journaled in said tool post and extending into said opening, a cam on said shaft within said opening engaging said plunger portion.

References Cited in the file of this patent

UNITED STATES PATENTS

| 167,974 | Ballou | Sept. 21, 1875 |
| 172,682 | Yule | Jan. 25, 1876 |
| 434,475 | Simonds | Aug. 19, 1890 |
| 602,449 | Hill | Apr. 19, 1898 |
| 670,962 | Lodge et al. | Apr. 2, 1901 |
| 767,025 | Volker | Aug. 9, 1904 |
| 1,169,214 | Whitcomb | Jan. 25, 1916 |
| 1,754,630 | Klamp | Apr. 15, 1930 |
| 1,858,898 | Mesker | May 17, 1932 |
| 2,100,945 | De Graff | Nov. 30, 1937 |
| 2,167,189 | Verderber | July 25, 1938 |
| 2,168,633 | Smith | Aug. 8, 1939 |
| 2,465,393 | Obadiah | Mar. 29, 1949 |
| 2,486,075 | Strom | Oct. 25, 1949 |
| 2,497,059 | Thomas | Feb. 7, 1950 |

FOREIGN PATENTS

| 486,012 | France | June 30, 1917 |